United States Patent [19]

Little

[11] Patent Number: 5,416,310
[45] Date of Patent: May 16, 1995

[54] COMPUTER AND/OR SCANNER SYSTEM INCORPORATED INTO A GARMENT

[75] Inventor: Gary G. Little, Montclair, Calif.

[73] Assignee: Symbol Technologies, Inc., Bohemia, N.Y.

[21] Appl. No.: 68,024

[22] Filed: May 28, 1993

[51] Int. Cl.[6] ............................................. G06K 7/10
[52] U.S. Cl. .................................. 235/462; 235/472; 2/102
[58] Field of Search ................ 235/462, 472, 486; 2/94, 102

[56] References Cited

U.S. PATENT DOCUMENTS

| | | | |
|---|---|---|---|
| 2,156,504 | 5/1939 | Liss | 2/102 X |
| 3,588,359 | 6/1971 | Cribb | 179/1 R |
| 3,744,025 | 7/1973 | Bilgutay | 235/462 X |
| 4,087,864 | 5/1978 | LaBove et al. | 2/102 |
| 4,607,156 | 8/1986 | Koeppenaal et al. | 235/472 |
| 4,719,462 | 1/1988 | Hawkins | 342/20 |
| 4,825,471 | 5/1989 | Jennings | 2/94 |
| 4,827,534 | 5/1989 | Haugen | 2/108 |
| 4,876,724 | 10/1989 | Suzuki | 381/187 |
| 4,899,039 | 2/1990 | Taylor et al. | 250/209 |
| 4,916,411 | 4/1990 | Gombrich | 340/712 |
| 5,007,427 | 4/1991 | Suzuki et al. | 2/102 X |
| 5,024,360 | 6/1991 | Rodriguez | 2/94 X |
| 5,105,067 | 4/1992 | Brekkestran et al. | 219/497 |
| 5,144,120 | 9/1992 | Krichever et al. | 235/472 |
| 5,158,039 | 10/1992 | Clark | 119/29 |
| 5,208,449 | 5/1993 | Eastman et al. | 235/462 |
| 5,272,324 | 12/1993 | Blevins | 235/462 |
| 5,305,181 | 4/1994 | Schultz | 361/680 |
| 5,329,106 | 7/1994 | Hone et al. | 235/462 X |

FOREIGN PATENT DOCUMENTS

0264956A3 4/1988 European Pat. Off. .
1387091 3/1975 United Kingdom .

OTHER PUBLICATIONS

Orange County, Los Angeles Times, Monday, Oct. 13, 1991; Pacific Report–Japan Turns Fanciful in the Evolution of Computers (two sheets).

Primary Examiner—Donald Hajec
Assistant Examiner—Jeffrey R. Filipek
Attorney, Agent, or Firm—Lowe, Price, LeBlanc & Becker

[57] ABSTRACT

A portable data input or computer system includes a keyboard, another data input device such as an optical scanner, a data processor module, and a display. All of those system components are configured for carrying and/or securing on a garment, such as a vest. Typically, the garment has a number of pockets. The operator can wear the garment and carry the system components in pockets when not using them. At such times, the system components are out of the way. The display may be flipped up so that, when the system is in use, displayed data is visible to the operator without removing the display from the pocket. The operator may activate the keyboard with only one hand while it is still in its pocket, or the operator can remove the keyboard from the pocket, hold it in one hand and key in data with the other hand. To input other data, for example by scanning bar code type indicia, the operator removes the scanner from its pocket, points the scanner at the bar code and triggers the scanner to read the indicia. System batteries are contained in one or more separate pockets in the garment, and all signalling and power connections between the various components are provided by flexible cabling incorporated into the garment. The system is particularly easy to transport and operate.

7 Claims, 3 Drawing Sheets

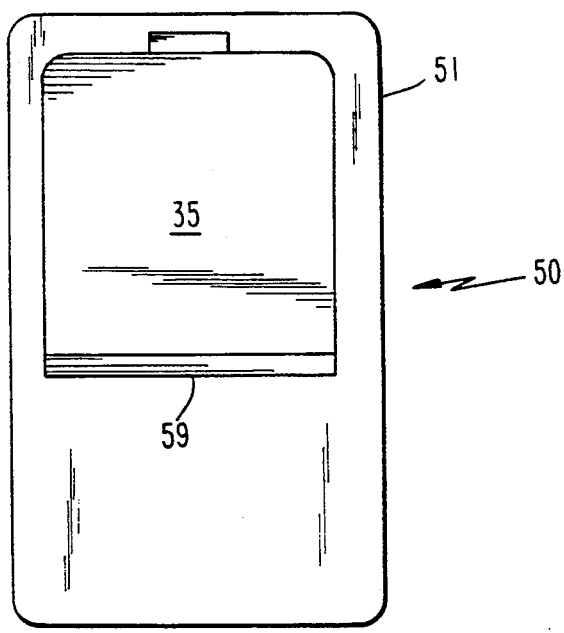
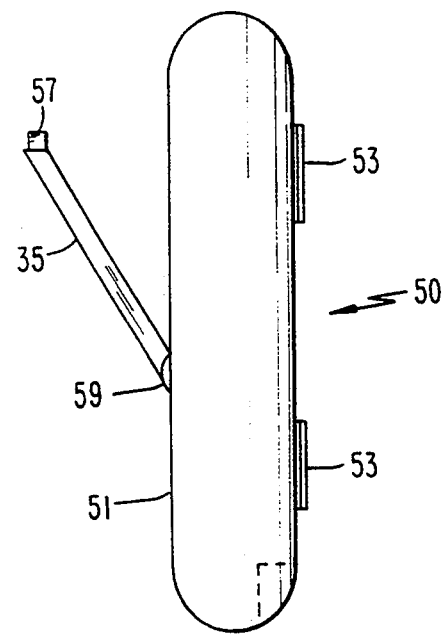
Figure 5A
Figure 5B
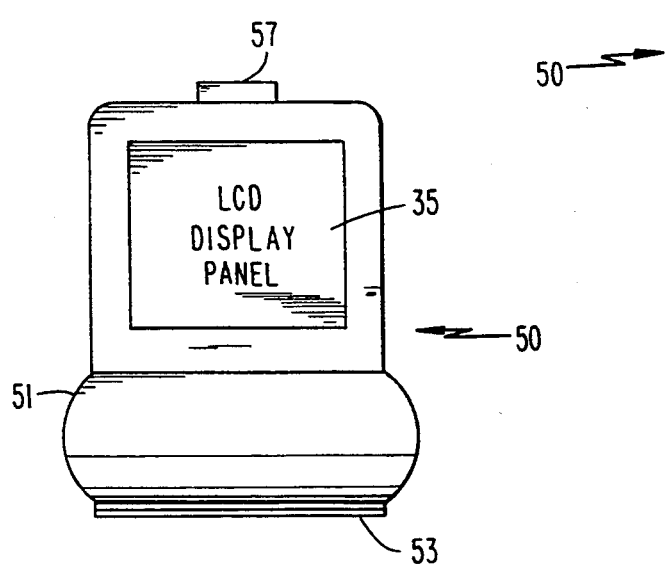
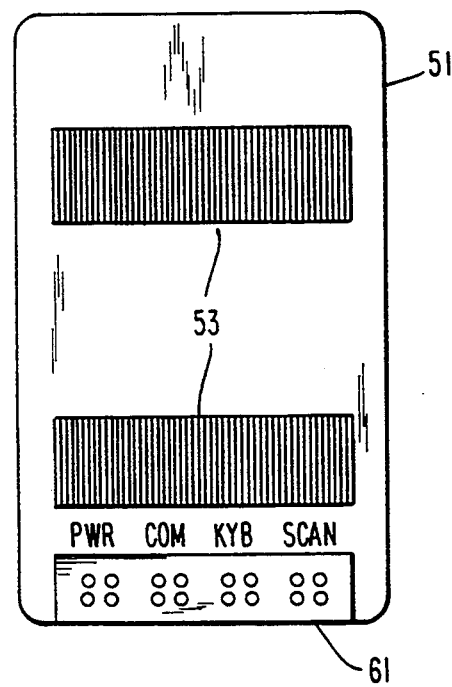
Figure 5C
Figure 5D

COMPUTER AND/OR SCANNER SYSTEM INCORPORATED INTO A GARMENT

TECHNICAL FIELD

The present invention relates to a portable computer or data input system, typically including an optical scanner, wherein the system is incorporated into a garment or the like worn by the system operator.

BACKGROUND ART

Optical readers, such as bar code readers, are now quite common. Typically, a bar code comprises a series of encoded symbols, and each symbol consists of a series of light and dark regions, typically in the form of rectangles. The widths of the dark regions, the bars, and/or the widths of the light spaces between the bars indicate the encoded information. A bar code reader illuminates the code and senses light reflected from the code to detect the widths and spacings of the code symbols and derive the encoded data.

Bar code reading type data input systems improve the efficiency and accuracy of data input for a wide variety of applications. The ease of data input in such systems facilitates more frequent and detailed data input, for example to provide efficient inventories, tracking of work in progress, etc. To achieve these advantages, however, users or employees must be willing to consistently use the bar code readers. Many applications require the operator to carry the bar code reader about as the operator moves from place to place and to operate the reader manually to scan codes appearing on different objects. The readers therefore must be easy and convenient to operate and carry.

Many applications additionally require use of the bar code reader with other data input means, for example by incorporation of all the elements into a single integrated data input terminal. Such integrated systems typically include a keyboard, for input of alphanumeric data which may or may not be related to bar code data, a central data processor unit having associated RAM and ROM, and a display. Integrated terminals of this type have been proposed which are small enough to be handheld (see e.g. U.S. Pat. Nos. 4,916,441 and 5,144,120). Such units incorporating so many different elements, however, tend to be larger than many dedicated bar code readers and cumbersome to operate as bar code readers, particularly for extended periods. Also, the prior art integrated devices often require the operator to hold the device in one hand and operate the keyboard with the other. Such operation requires use of both hands and does not allow the user to perform other manual tasks at the same time. These problems, together with problems related to securing and carrying the integrated terminals when not in use, tend to discourage employees from using the data input system, thereby defeating the purpose of the system and particularly the advantages otherwise associated with bar code data entry. Similar problems exist in other types of portable computer or data devices.

From the above discussion of the state of the art, it becomes clear that a need still exists to produce portable computer or terminal systems, particularly ones incorporating an optical reader unit, which are particularly convenient to carry and operate.

DISCLOSURE OF THE INVENTION

The present invention addresses the above problems and needs by designing a portable computer system with all of the system components incorporated into an item of personal wear, for example into a garment such as a shirt, a vest or a pair of pants.

The garment has a number of separate means for supporting objects to be carried by the wearer of the garment. The support means may be fasteners attached to the garment, for example VELCRO TM, i.e. loop and hook tabs. In the preferred embodiment, the support means are pockets. In the embodiment using pockets a module containing the data processor is secured in one of the pockets, for example by VELCRO TM strips. One or more data input devices are carried in other pockets of the garment. In the preferred embodiment, the data input devices include a keyboard and an optical reading unit for reading optically encoded indicia.

As used in this specification and in the appended claims, the term "indicia" broadly encompasses not only symbol patterns composed of alternating bars and spaces of various widths commonly referred to as bar code symbols, but also other one or two dimensional graphic patterns, as well as alphanumeric characters. In general, the term "indicia" may apply to any type of pattern or information which may be recognized or identified by scanning a light across it and detecting reflected or scattered light as a representation of variations in light reflectivity at various points of the pattern or information. A bar code is one example of "indicia" which the present invention can scan, preferably by using an optical reading unit in the form of a small moving spot laser beam scanner.

The keyboard permits single handed operation in the pocket; but the keyboard can be removed, held in one hand and operated by the other hand. The keyboard contains a limited key set, however, the keyboard is programmable or trainable for specific operations and allows "chord"-ing of key activations to increase the functionality of the limited key set.

One or more batteries contained in pockets or otherwise supported on the garment provide all operating power for the system. Preferably, the batteries are rechargeable. Flexible cables or conductors carry the power from the batteries and carry all signals going to and from the various system components. The cables carrying the signals may be electrical cables or optical fibers. The cables or conductors may be sewn into channels in the garment or woven into the fabric of the garment. The cables to the optical reading unit and the keyboard have sufficient length to allow the operator to remove those units from the holstered positions in the respective pockets during use.

The portable data system also includes data output means carried by the item of personal wear. These output means might provide a perceptible indication of data to an operator wearing the garment. These output means might also permit data communication to a host computer system.

The preferred embodiment uses a flip-up display structure as one means for outputting data from the processor module. More specifically, the central processor unit is contained in a module secured on the garment, for example in a vest pocket. A hinge movably attaches the display to the module housing. In one position, the display is retracted or pivoted out of the way. In another position, however, the display extends out from the module housing so that data shown on the display is visible to the operator. In this hinged configuration, the display may be attached to a flap or fold of the pocket. A microswitch may be used to control display power so that display power is off when the display is in the retracted position, and display power is on when the display is positioned for viewing of data by the operator.

A connector and/or cabling can be used as another output means to facilitate connection of the data processor to a host computer for communication of data therebetween. Alternatively, the system may include a wireless data transceiver.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

FIGS. 5A to 5D are front, side, top and back views respectively of the module which includes the central processor and the display.

BEST MODE FOR CARRYING OUT THE INVENTION

Figure 1:
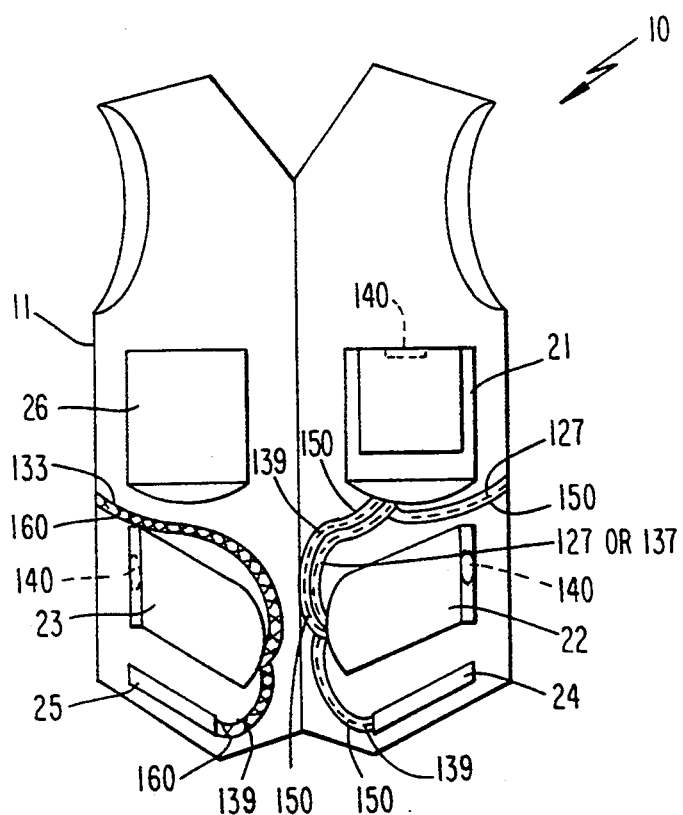
FIG. 1 is a front view of a vest implementation of a scanner and data terminal system of the present invention.

The portable data system 10 includes an item of personal wear, such as garment 11, which is worn by the system operator, typically on the upper body. In the example illustrated in FIGS. 1 and 2, the garment 11 is a vest. The vest is made of a relatively light weight durable material, such as rip-stop nylon. As such, the operator may wear the vest comfortably in all seasons of the year. The vest has a number of pockets for carrying the various components of the terminal and scanner system.

As shown, the vest has six pockets 21-26 which serve as support means for carrying the various electrical components of the system, and other objects if desired. One pocket 21 carries a module comprising the processor and display. The module is secured in pocket 21 in a manner discussed in more detail with regard to FIGS. 5B and 5D. Another pocket 22 carries an optical reading unit or scanner, for example to read bar codes or the like; and a pocket 23 carries a touch sensitive keyboard used for alphanumeric data input and the like. The pockets 22 and 23 would have buttons, snaps, VELCRO TM, i.e. loop and hook, fasteners 140 or the like to firmly close those pockets and thereby secure the scanner and keyboard in those pockets. One or two pockets 24, 25 along the lower edge of the vest 11 carry rechargeable batteries for supplying power to the electrical components of the data system 10. The battery pockets 24, 25 could include closure means or fasteners similar to those used on pockets 22 and 23, or pockets 24, 25 could include VELCRO TM fasteners directly attached to the batteries to secure the batteries in the pockets. One pocket 26 is left empty to allow the operator to carry other items, as desired.

Figure 2:
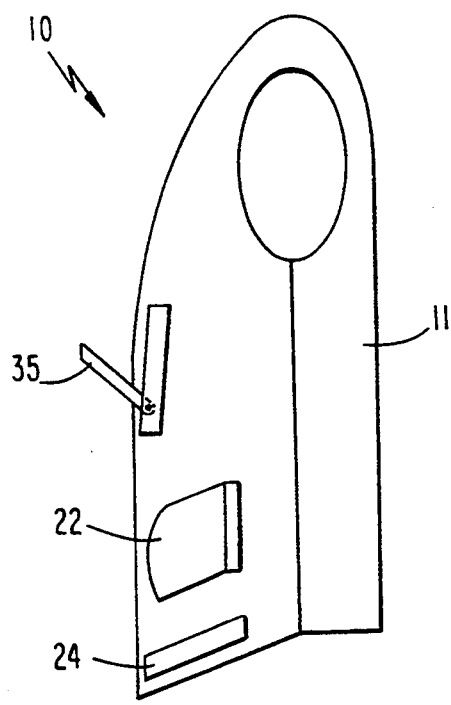
FIG. 2 is a left side view of the vest implementation of the data system of FIG. 1.

The precise layout of the pockets in the embodiment of FIGS. 1 and 2 is illustrative only, and other pocket arrangements may be used for comfort and convenience of different operators and/or to facilitate particular data input operations. Also, other support means may be used in place of one or more of the pockets. For example, detachable fasteners (e.g., VELCRO TM or snaps) may be used which would directly attach one or more of the electrical components directly to the garment.

Figure 3:
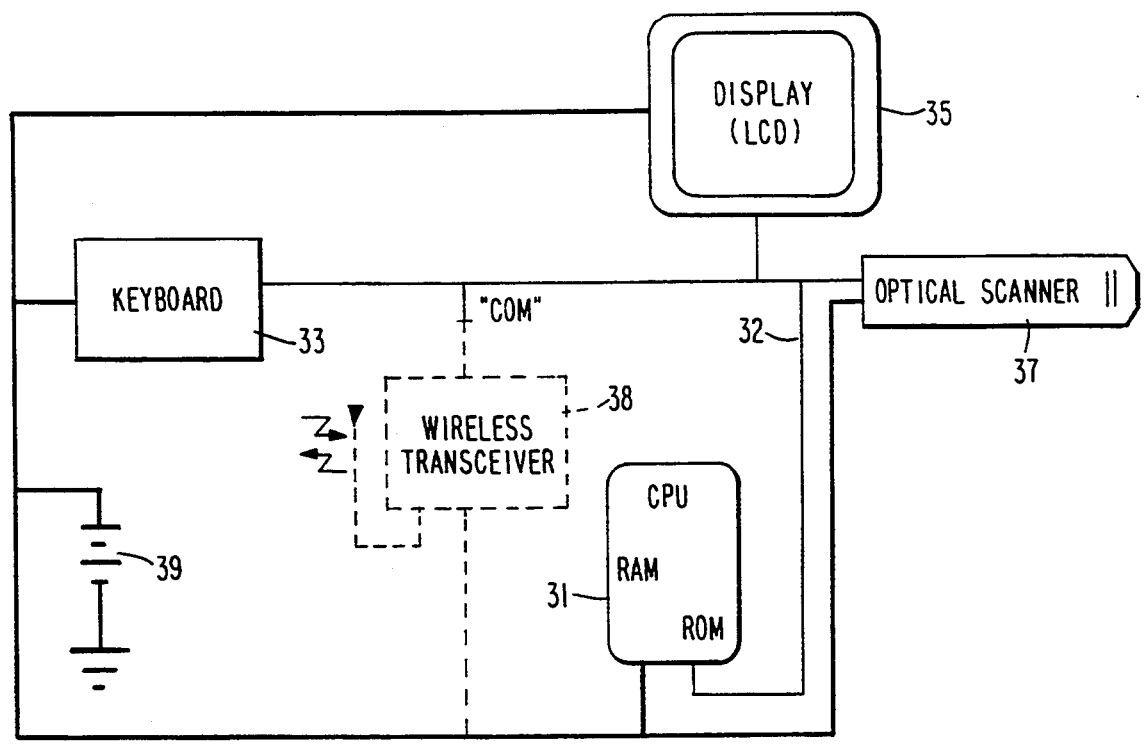
FIG. 3 is a simplified electrical block diagram of the scanner and terminal system components used in the present invention.

FIG. 3 illustrates in much simplified form the electrical components of the data system. As shown, the system includes a microprocessor based data processor 31. Typically, the data processor 31 includes a central processor unit (CPU), a random access memory (RAM) for storing data, a read only memory (ROM) for storing fixed programming data, etc. As such, the data processor 31 may consist of elements similar to those found in a 16-bit handheld or laptop type personal computer. Cable connections 32 are provided for the various signal communications between the data processor unit 31 and the keyboard 33, the liquid crystal type display (LCD) 35 and the optical scanner 37. A battery system.39 provides power to the data processor 31, the keyboard 33, the liquid crystal type display 35 and the optical scanner 37. The system may use a single battery pack in one pocket or two battery packs in two pockets (FIG. 1), as necessary to provide adequate power for the specific system components to operate for a desired time.

To provide a data link to an external host computer, the data processor 31 will connect to a "COM" port on the exterior of the module housing (see FIG. 5D). The COM port could be a serial or parallel type data port of a standard configuration.

The system might also include a wireless transceiver 38 (e.g. infrared or radio frequency) shown in phantom in FIG. 3. The wireless transceiver would connect via flexible cable to the COM port and would permit two way data communication between the data processor 31 and an external host computer system while the operator is wearing the garment and moving about to collect bar code data and/or inputting alphanumeric data.

In a preferred embodiment using wireless transmission, the wireless transceiver would be a spread spectrum type radio transceiver contained in a separate module. The transceiver module would include shielding to prevent interference and would be carried in another pocket of the vest. This embodiment of the system would also include a flexible RF antenna connected to the spread spectrum transceiver. The antenna could be sewn on or woven into the fabric of the back portion of the vest.

FIGS. 5A to 5D show the main unit of the system, processor and display module 50. The module has a housing 51 which contains the data processor 31 and various associated interface circuitry. The module 50 also includes the LCD type data display device 35 attached to the housing 51 by a movable support structure, such as a hinge 59. When not in use, the operator folds the display 35 up flat against the module housing 51, and a clasp 57 fastens it in a retracted out of the way position. When in use, the operator pulls the display 35 out to an angle approximately vertical with respect to the module housing (see FIG. 2). The LCD components of the display 35 provide visible information output on the upper surface of the display, when so positioned. The operator can tilt his or her head down slightly, look down at the LCD 35 and read the displayed information. The top view of module 50 with the display open, as shown in FIG. 5C, essentially illustrates the operator's view of the processor and display module when looking down to read data visible on display 35. The display can be attached to a flap of the pocket by VELCRO ™ or the like, or it can fold out through an opening in the front wall of the pocket.

The module 50 also includes a microswitch (not shown) located so as to be sensitive to the position of the LCD display panel 35. When the display is in the closed or retracted position flush against the housing 51, the microswitch cuts off power to the display 35. When the display 35 is folded down so that data shown thereon is visible to the system operator wearing the garment, the microswitch completes the necessary circuit to supply power from the battery system 39 to the display 35.

VELCRO ™ strips 53 are attached to the rear surface of the module 50 (FIGS. 5B and 5D), and woolen strips (not shown) are attached at corresponding locations on the rear wall of the pocket. When the module 50 is holstered in the pocket 21, the Velcro ™ and woolen strips secure that module in the vest pocket. Alternatively, the VELCRO ™ and woolen strips may be used to support the module 50 on the garment material without use of a pocket at all.

As shown in FIG. 5D, the housing 51 has a connection panel 61 formed in the lower back section thereof. The panel 61 includes a power connection "PWR" to which conductors carrying power from the battery system 39 are connected. Flexible cables from the keyboard 33 would connect to the "KyB" connector in panel 61, flexible cables from the optical scanner 37 connect to the "SCAN" connector.

Flexible cables 133 and 127, respectively attached to or incorporated into the garment 11 in FIG. 1, form the cable connections 32 for carrying the signals between the module 50 and the keyboard 33 and the optical scanner 37. Similarly, flexible cables 139 in FIG. 1 carry power from the battery system 39 to the data processor 31 and display 35 in module 50 and to the keyboard 33 and the optical scanner 37. The flexible cables may take the form of wires or leads sewn into channels 150 formed in the garment 11 or may take the form of electrical conductors woven in areas 160 into the garment fabric.

The panel 61 also includes a "COM" connector. This connector permits connection to the data processor in module 50 to a communication means. This may take the form of a cable connection to a host computer system for downloading data from the portable system to the host and or programming tile portable system from the host. The cable from the host may connect directly to the "COM" connector on the module 50 by temporarily running a cable from the host into the pocket 21, or by removing the module from the pocket and making the necessary connection. Alternatively, the vest may include another flexible cable woven into the vest fabric or sewn into a channel in the vest essentially providing an extension of the "COM" connection to a more convenient external point on the garment. The host computer would be connected to that external point, and the flexible cable would provide a link through the vest to the "COM" connection on the module for carrying data signals between the external host computer and the data processor 31. As a further alternative, the system may include wireless communication module, for example an infrared or radio frequency transceiver, connected to the COM port for providing two-way communication between the host computer system and the portable data system.

Figure 4:
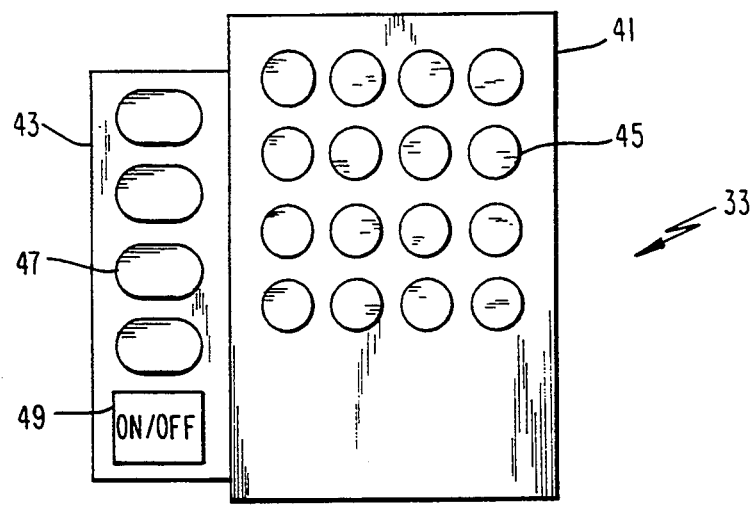
FIG. 4 is a plan view of a touch sensitive keyboard, set up for right handed operation, as could be used in the data system illustrated in FIGS. 1 to 3.

The keyboard 33 is small enough to fit in one of the pockets 23 and is configured for one-handed operation. FIG. 4 illustrates one example of the keyboard set up for right handed operation. As shown, the keyboard includes two sections, 41 and 43. The large section 41 has four columns of keys, one column for operation by each finger of the right hand. The smaller section 43 has a single column of keys for operation by the thumb of the right hand. For left hand operation, the small section would be located at the opposite side of the large section 41. In the illustrated example, each column of keys in the large section 41 includes four input keys 45, and the section 43 has four input keys 47 and an "ON/OFF" key 49 for controlling system power. The columns could include smaller or larger numbers of keys as appropriate for desired data input operations. The keyboard, however, should include relatively few keys as shown so that the operator can easily holster the keyboard 33 in the pocket 23.

The input keys 45 are typically used for input of actual alphanumeric data. The alphanumeric value(s) assigned to each key, alone or in combination with one or more of the function keys 47, can be programmed into the data processor 31 and the keyboard 33. For example, repeated activation of one of the four function keys might cycle the keyboard 33 through a numeric mode and one or more alphabetic modes. The numeric mode might emulate the number pad on a computer keyboard or on a calculator, and each alphabetic mode might emulate a segment of an alphabetic key set. For the operator's convenience, the LCD display might provide an indication of the current keyboard mode.

The other function keys 47 would permit the operator to program in a variety of special functions. For example, the system might be trained or programmed so that in certain modes each key might represent a long string of alphabetic or control character inputs. The system would also recognize concurrent activation of plural keys (chording) to further extend the range of possible data inputs through the limited set of keys on keyboard 33.

As noted above, the keyboard is configured to allow one handed operation without removal thereof from its pocket 23 in the garment 11. The cabling providing the power and signalling connections to the keyboard, however, will be long enough and flexible enough to permit the operator to occasionally remove the keyboard from the pocket, hold it in one hand and operate it with the other. The cabling to the keyboard would be short enough and/or coiled to retract into and be stored in the pocket 23 with the keyboard.

A variety of known optical reading devices may serve as the scanner 37. One particularly advantageous type of reader is an optical scanner which scans a beam of light, such as a laser beam, across the indicia. Such laser scanner systems are generally designed to read indicia having parts of different light reflectivity, e.g., bar code symbols, particularly of the Universal Product Code (UPC) type, at a certain working or reading distance from a hand-held or stationary scanner.

In a typical optical scanner system, a light source such as a laser generates a light beam which is optically modified to form a beam spot of a certain size at the working distance and is directed by optical components along a light path toward a bar code symbol located in the vicinity of the working distance for reflection from the symbol. An optical sensor or photodetector having a field of view extending across and slightly past the symbol detects light of variable intensity reflected off the symbol and generates electrical signals indicative of the detected light. A scanning component is situated in the light path. The scanning component may either sweep the beam spot across the symbol and trace a scan line across and past the symbol, or scan the field of view of the photodetector, or do both.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The pulse signal from the digitizer is applied to a decoder. The decoder first determines the pulse widths and spacings of the signal from the digitizer. The decoder then analyzes the widths and spacings to find and decode a legitimate bar code message. This includes analysis to recognize legitimate characters and sequences, as defined by the appropriate code standard. This may also include an initial recognition of the particular standard the scanned symbol conforms to. This recognition of the standard is typically referred to as auto discrimination. Typically, the various decoder functions are performed by a microprocessor, with associated program memory and random access data memory.

In a typical implementation of the portable data system shown in the drawings, the scanner 37 would include at least the laser light source, the scanning component or other means for producing beam motion, and the photodetector. The digitizer and/or the microprocessor decoder may be also elements of the scanner. In such a case, the scanner would provide digital data signals to the data processor 31. Alternatively, the data processor 31 may perform the decoder function. In this later case, the digitizer may be in the scanner or the digitizer may be in the module housing 51.

The cabling providing the power and signalling connections to the optical reading unit will be long enough to permit the operator to take the unit out of the pocket 22 and use the optical reading unit to scan a bar code or other indicia. The cabling to the optical reader unit would be short enough and/or coiled to retract into and be stored in the pocket 22 with the optical reading unit. If the optical reading unit is a moving spot scanner, such as scanner 37, the system operator would remove the optical scanner 37 from its vest pocket 22 and point it at the indicia. The operator would then activate a trigger switch (not shown) on the scanner 37 to activate the scanner's light beam, the internal scanning motor, the photodetector and the detector and decoder circuitry.

Alternatively, the optical reading unit may take the form of a contact or wand type device. In this case, the operator would turn on the data system, touch the tip of the wand to the surface on which the indicia appears and manually move the tip across the indicia.

The present invention may use a variety of alternative forms of the moving spot optical scanner. For example, scanners have been proposed wherein the light beam source is located in a separate module. One or more optical fibers carry the light from the source to a scan head unit which includes optical elements for producing the scanning motion of the beam. Published European Patent Application No. 264,956 discloses one example of such an optical code reader unit using an optical fiber. To adapt this approach to the optical reader in the present invention, the laser diode for producing the scanning beam would be located within the module 50. An optical fiber 137 would then connect the module 50 to the scan head unit 37. The optical fiber 137 would be sewn into a channel 150 of the garment or woven into the fabric of the garment, in a manner similar to that used for the various flexible cable type electrical connections discussed earlier.

With the laser light source located in the module 50, additional fibers may be added for carrying light therefrom to other parts of the vest for other purposes. In particular, the distal ends of a number of these additional fibers could extend out through the surface of the garment fabric at various points. The light emitted from the exposed distal ends of the fibers would be visible to other persons looking at the person wearing the system garment. Because each fiber end would emit a very narrow beam of light, however, the light visible from any given direction would be limited. Light from different exposed fiber ends would be visible only from different view points. As a result, when the person wearing the garment moves with respect to an observer, the visible light and/or the color thereof would change. This can provide a particularly pleasing decorative effect and/or makes observance of the person wearing the vest easy at night or in other dark environments.

The preferred embodiment includes two input means, the keyboard and the optical scanner. The portable data system may include other input means, such as a mouse or joy stick, either in addition to the two input means used in the preferred embodiment or as a replacement for the keyboard or the scanner.

A variety of additional modifications of the data system described above will be apparent to readers who are skilled in the art.

What is claimed is:

1. A portable data system, comprising:
    a garment wearable by a system operator and having pockets;
    a first input means for producing electrical signals corresponding to sensed input, said first input means being manually operable by the system operator, and for storage in a pocket of said garment;
    a second input means for manual input of alphanumeric data by the system operator, said second input means being mountable in a pocket of said garment;
    a processor module separate from but connected to both the first input means and the second input means, said processor module being mounted in another pocket of said garment, wherein the processor module receives the electrical signals produced by the first input means and receives electrical signals from the second input means representative of manual inputs from the system operator; and
    output means for providing a perceptible indication of data output by the processor module.

2. A portable data system as in claim 1, wherein said output means comprises a data display, said system further comprising means for attaching said data display to said processor module.

3. A portable data system, as in claim 2, wherein said means for attaching movably attach said data display to said the processor module such that:
in a first position the data display extends out from the processor module so that data shown on the data display is visible to the system operator, and
in a second position said data display is substantially out of normal line of sight of the system operator.

4. A portable data system as in claim 1, further comprising means for securing the processor module in said another pocket.

5. A portable data system, as in claim 4, wherein said means for securing comprises at least one loop or hook strip.

6. A portable data system as in claim 1, wherein said first input means comprises a moving spot laser scanner for reading indicia of varying light reflectivity.

7. A portable data system as in claim 6, wherein said moving spot laser scanner is a handheld type device and is stored in a pocket of the garment.

* * * * *